US012702965B2

(12) United States Patent
Sharma et al.

(10) Patent No.: US 12,702,965 B2
(45) Date of Patent: Aug. 11, 2026

(54) CARBON SORBENT-AZOBENZENE HYBRIDS FOR CARBON CAPTURE AND METHODS OF PRODUCING AND/OR USING SAID HYBRIDS

(71) Applicant: Schlumberger Technology Corporation, Sugar Land, TX (US)

(72) Inventors: Richa Sharma, Cambridge, MA (US); Z. Frank Zheng, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 308 days.

(21) Appl. No.: 18/534,895

(22) Filed: Dec. 11, 2023

(65) Prior Publication Data

US 2025/0065300 A1 Feb. 27, 2025

Related U.S. Application Data

(60) Provisional application No. 63/520,837, filed on Aug. 21, 2023.

(51) Int. Cl.

| | |
|---|---|
| ***B01D 53/02*** | (2006.01) |
| ***B01J 20/20*** | (2006.01) |
| ***B01J 20/22*** | (2006.01) |
| ***B01J 20/32*** | (2006.01) |

(52) U.S. Cl.

CPC .............. *B01J 20/20* (2013.01); *B01D 53/02* (2013.01); *B01J 20/22* (2013.01); *B01J 20/3204* (2013.01); *B01J 20/3217* (2013.01); *B01J 20/3253* (2013.01); *B01D 2253/102* (2013.01); *B01D 2253/20* (2013.01); *B01D 2253/25* (2013.01); *B01D 2257/504* (2013.01)

(58) Field of Classification Search

CPC . B01D 53/02; B01J 20/20; B01J 20/22; B01J 20/32

See application file for complete search history.

(56) References Cited

U.S. PATENT DOCUMENTS

2019/0119120 A1 * 4/2019 El-Kaderi .............. B01D 53/04

OTHER PUBLICATIONS

Feng et al. Scientific Reports 3: 3260 (2013) pp. 1-8 (Year: 2013).*
Mohamed et al. Materials Today Communication 24 (2020) 101111 (Year: 2020).*

(Continued)

*Primary Examiner* — Sharon Pregler

(74) *Attorney, Agent, or Firm* — Jeffrey D. Frantz

(57) ABSTRACT

Modified carbon-based sorbents configured for improved carbon capture, methods for increasing $CO_2$ capture potential of modified carbon-based sorbents, and methods for improving noncovalent interactions of modified carbon-based sorbents with $CO_2$, $N_2$, and $H_2$ are disclosed herein. The modified carbon-based sorbents have porous carbon surfaces and/or mesoporous carbon surfaces comprising one or more in-plane sites having at least one first nitrogen functionality and one or more out-of-plane sites having at least one second nitrogen functionality, wherein the at least one first nitrogen functionality is a different nitrogen functionality than the at least one second nitrogen functionality. The methods comprise contacting the modified carbon-based sorbents to gaseous streams containing $CO_2$.

18 Claims, 6 Drawing Sheets

Carbon-azobenzene sorbent

N-doped Carbon-azobenzene sorbent

(56) References Cited

OTHER PUBLICATIONS

Sharma et al., “Anomalously Large Reactivity of Single Graphene Layers and Edges toward Electron Transfer Chemistries”, retrieved from https://doi.org/10.1021/nl902741x, Nano Lett., vol. 10, Issue 2, pp. 398-405.
Vinayan, “Heteroatom-Doped Graphene-Based Hybrid Materials for Hydrogen Energy Conversion”, retrieved from https://dx.doi.org/10.5772/64242, Recent Advances in Graphene Research, Oct. 12, 2016, 18 pages.
Katoh et al., “Growth of N-Doped graphene from nitrogen containing aromatic compounds: the effect of precursors on the doped site”, retrived from https://doi.org/10.1039/c5ra22664c, RSC Advances, vol. 6, 2016, pp. 13392-13398.
Khosrowshahi et al., “The role of surface chemistry on CO2 adsorption in biomassd-derived porous carbons by experimental results and molecular dynamics simulations”, retrieved from https://doi.org/10.1038/s41598-022-12596-5, Scientific Reports, No. 12, May 26, 2022, 19 pages.
Creamer et al., “Carbon-Based Adsorbents for Postcombustion CO2 Capture: A Critical Review”, retrieved from https://doi.org/10.1021/acs.est.6b00627, Environmental Science & Technology, vol. 50, Issue 14, Jun. 3, 2016, pp. 7276-7289.
Sevilla et al., “High-Performance CO2 Sorbents from Algae”, retrieved from https://doi.org/10.1039/c2ra22552b., RSC Adv. 2012, vol. 2, Issue 33, pp. 12792-12797.
Search Report and Written Opinion of International Application No. PCT/US2024/043046 dated Dec. 16, 2024, 11 pages.
Xue, D.-M et al., “Fabrication of azobenzene-functionalized porous polymers for selective CO2 capture”, Chinese Journal of Chemical Engineering, 2022, vol. 43, p. 24-30.

* cited by examiner $CO_2$ Interacting with the diazo bridge of azobenzene $N_2$ Interacting with the diazo bridge of azobenzene

CARBON SORBENT-AZOBENZENE HYBRIDS FOR CARBON CAPTURE AND METHODS OF PRODUCING AND/OR USING SAID HYBRIDS

CROSS REFERENCE TO RELATED APPLICATION

This application claims the benefit under 35 U.S.C. § 119(e) of U.S. Provisional Patent Application No. 63/520,837, filed on Aug. 21, 2023, which is incorporated herein by reference in its entirety.

FIELD OF THE DISCLOSURE

The present disclosure relates to one or more carbon sorbent-azobenzene hybrids configured for carbon capture and/or adapted to capture carbon. The one or more carbon sorbent-azobenzene hybrids have, comprise, include, or consist of surface chemistry or surface chemistries configured for selective $CO_2$ adsorption in porous carbon, mesoporous carbon, or a combination thereof. The surface chemistry or surface chemistries disclosed herein may simultaneously provide, include, comprise, and/or consist of one or more in-plane sites, one or more out-of-plane sites, or a combination thereof with different nitrogen functionalities that include, comprise, and/or consist of one or more N doping sites, one or more azobenzene (hereinafter "azo") groups, or a combination thereof. In some embodiments, the one or more N doping sites may include, comprise, or consist of one or more graphitic sites, one or more pyrrolic sites, one or more pyridinic sites, one or more pyridine sites, or a combination thereof. Moreover, the present disclosure also relates to methods of producing, providing, or manufacturing the carbon sorbent-azobenzene hybrids and/or methods of using the one or more carbon sorbent-azobenzene hybrids for post-combustion $CO_2$ capture, pre-combustion $CO_2$ capture, a combination thereof, or the like. In one or more methods disclosed herein, the one or more carbon sorbent-azobenzene hybrids may contact one or more gas streams having, containing, or comprising $CO_2$ therein.

BACKGROUND

Known carbon-based sorbents are among the industrial adsorbents for air, water, or solvent purification systems. Many effective synthesis strategies have been formulated to generate carbon-based sorbents including biomass-derived, polymer-based synthetic porous carbons, carbonized carbohydrate substrates, like cellulose and the commercially available activated carbons. The functionality of porous carbon arises from the key structural feature of randomly stacked microcrystalline graphitic domains which are traditionally tuned based on the parameters of the synthesis procedure such as pyrolysis and activation conditions. Due to their highly porous structure and specific surface area, known carbon-based sorbents are typically mesoporous sorbents, which makes the known carbon-based sorbents effective gas adsorbents.

Particularly, the inherent potential of carbon sorbents for addressing a range of issues in amine solvent-based $CO_2$ capture, including corrosion, amine emissions, energy cost, and mass transfer. This class of known sorbents may offer an advantage due to their simplicity and convenience of operation. Examples of this class of known sorbents include carbonaceous materials, such as, for example, activated carbon, biomass-derived carbon, polymer-based carbon, and porous/mesoporous carbons. However, achieving effective separation performance is a significant disadvantage associated with these known carbon sorbent technologies.

Surprisingly, the carbon sorbent-azobenzene hybrids disclosed herein overcome this disadvantage by including, providing, comprising, or consisting of at least one surface chemistry that simultaneously provides in-plane sites and/or out-of-plane sites with different nitrogen functionalities including N doping sites and/or azo groups.

SUMMARY OF THE DISCLOSURE

In one or more embodiments, a carbon-based sorbent is configured for improved carbon capture and comprises at least one modified carbon-based sorbent comprising porous carbon surfaces and/or mesoporous carbon surfaces configured to improve selective $CO_2$ adsorption, wherein the porous carbon surfaces and/or the mesoporous carbon surfaces comprise one or more in-plane sites having at least one first nitrogen functionality and one or more out-of-plane sites having at least one second nitrogen functionality, and the at least one first nitrogen functionality is a different nitrogen functionality than the at least one second nitrogen functionality.

In an embodiment, the one or more in-plane sites is/are one or more nitrogen doping sites.

In an embodiment, the one or more in-plane sites is/are one or more graphitic-N sites, one or more pyrrolic-N sites, one or more pyridinic-N sites, one or more pyridine-N sites, or a combination thereof.

In an embodiment, the one or more out-of-plane sites is/are one or more azobenzene-N sites.

In an embodiment, the one or more in-plane sites are at least one graphitic-N site, at least one pyrrolic-N site, at least one pyridinic-N site, and at least one pyridine-N site, and the one or more out-of-plane sites are one or more azobenzene-N sites.

In an embodiment, the at least one modified carbon-based sorbent is a carbon sorbent-azobenzene hybrid.

In an embodiment, the carbon sorbent-azobenzene hybrid is a N-doped-carbon sorbent-azobenzene hybrid.

In one or more embodiments, a method may increase $CO_2$ capture potential of at least one modified carbon-based sorbent and comprises covalently functionalizing at least one carbon lattice of a carbon-based sorbent comprising porous carbon surfaces and/or mesoporous carbon surfaces, incorporating one or more in-plane $CO_2$ philic groups and one or more out-of-plane $CO_2$ philic groups into the carbon-based sorbent, and incorporating one or more out-of-carbon lattice plane nitrogen functionalities into the carbon-based sorbent to produce the at least one modified carbon-based sorbent.

In an embodiment, the at least one modified carbon-based sorbent of the method is a carbon sorbent-azobenzene hybrid.

In an embodiment, the carbon sorbent-azobenzene hybrid of the method is a N-doped-carbon sorbent-azobenzene hybrid.

In an embodiment, the one or more in-plane $CO_2$ philic groups of the method comprises nitrogen doping groups.

In an embodiment, the nitrogen doping groups of the method are one or more graphitic-based groups, one or more pyrrolic-based groups, one or more pyridinic-based groups, one or more pyridine-based sites, or a combination thereof.

In an embodiment, the one or more out-of-plane $CO_2$ philic groups of the method is/are one or more azobenzene-based groups.

In an embodiment, the one or more in-plane $CO_2$ philic groups of the method are at least one graphitic-N group, at least one pyrrolic-N group, at least one pyridinic-N group, and at least one pyridine-N group, and the one or more out-of-plane $CO_2$ philic groups are one or more azobenzene-N groups.

In an embodiment, the method further comprises improving selective $CO_2$ adsorption by simultaneously activating the one or more in-plane $CO_2$ philic groups and the one or more out-of-plane $CO_2$ philic groups.

In one or more embodiments, a method may improve noncovalent interactions of a modified carbon-based sorbent with $CO_2$, $N_2$, and $H_2$ and comprises providing the modified carbon-based sorbent comprising porous carbon surfaces and/or mesoporous carbon surfaces, and simultaneously activating one or more in-plane sites and one or more out-of-plane sites of the porous carbon surfaces and/or the mesoporous carbon surfaces, wherein the one or more in-plane sites have at least one first nitrogen functionality that is a different nitrogen functionality than at least one second nitrogen functionality of the one or more out-of-plane sites.

In an embodiment, the method further comprises selectively capturing $CO_2$ with the modified carbon-based sorbent during syngas processing, post-combustion processing, or pre-combustion processing.

In an embodiment, the modified carbon-based sorbent of the method is a carbon sorbent-azobenzene hybrid or a N-doped-carbon sorbent-azobenzene hybrid.

In an embodiment, the one or more in-plane sites is/are nitrogen doping sites and the one or more out-of-plane sites of the method is/are azobenzene-N sites.

In an embodiment, the method further comprises contacting the modified carbon-based sorbent to at least one gaseous stream having, containing, and/or comprising carbon.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
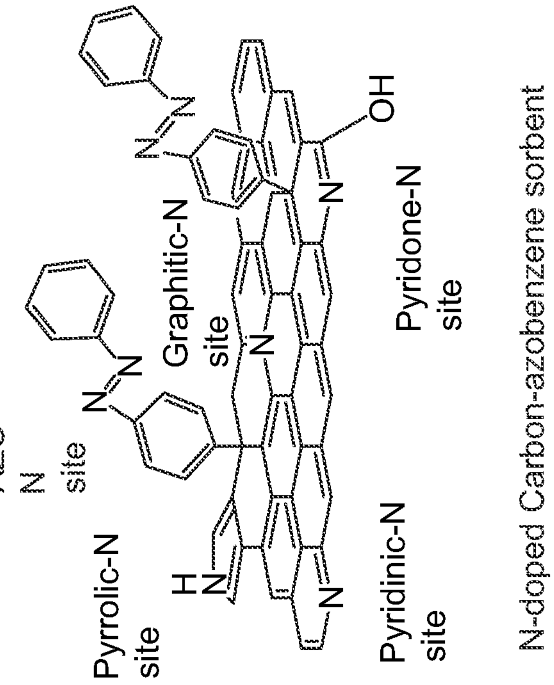
FIG. 1 illustrates examples of a class of modified carbon sorbents, according to one or more embodiments of the present disclosure.
Figure 1:
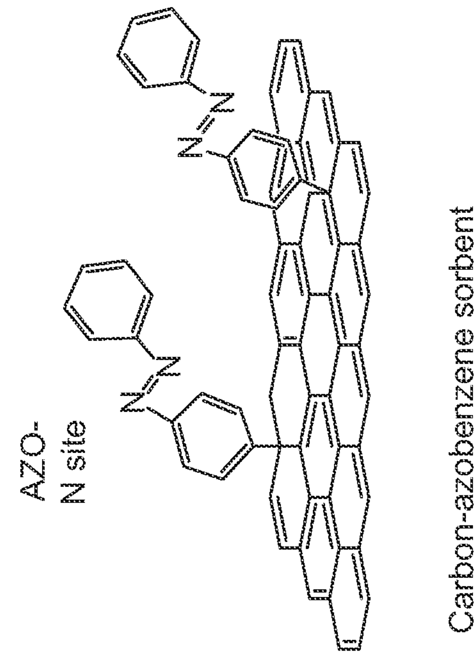

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

The present disclosure is directed to and relates to one or more carbon sorbent-azobenzene (hereinafter "CS-AZO") hybrids (hereinafter "CS-AZO hybrids") for carbon capture, one or more methods of producing or providing the CS-AZO hybrids, and one or more methods of using the CS-AZO hybrids to capture carbon. The CS-AZO hybrids include, comprise, or consist of at least one enhanced surface chemistry (hereinafter "the surface chemistry") that surprisingly achieves improved carbon capture and/or $CO_2$ adsorption. In some embodiments, the at least one enhanced surface chemistry is configured for selective $CO_2$ absorption and/or capture in porous carbon surfaces, mesoporous carbon surfaces, or a combination thereof. Further, the CS-AZO hybrids may utilize, have, comprise, or consist of one or more porous carbon surfaces and/or one or more mesoporous carbon surfaces with one or more varied nitrogen functionalities including one or more in-plane nitrogen doping sites, one or more in-plane azo groups, and/or one or more out-of-plane azo groups. Embodiments of the surface chemistry disclosed herein may engage in or facilitate selective $CO_2$ adsorption and/or the one or more N doping sites may include, for example, one or more graphitic groups, one or more pyrrolic groups, one or more pyridinic groups, one or more pyridine groups, or a combination thereof. In at least one embodiment, the methods disclosed herein may utilize the CS-AZO hybrids to benefit or improve at least one of syngas processing, post-combustion $CO_2$ capture, pre-combustion $CO_2$ capture, or a combination thereof. Moreover, the surface chemistry disclosed herein may simultaneously provide one or more in-plane sites and/or one or more out-of-plane sites with one or more different nitrogen functionalities including the one or more N doping sites and one or more azo groups. In at least one embodiment, the one or more different nitrogen functionalities may be, comprise, or consist of at least one graphitic group, at least one pyrrolic group, at least one pyridinic group, at least one pyridine group, or a combination thereof.

The enhanced surface chemistry, disclosed herein, of porous carbon, mesoporous carbon, or both porous and mesoporous carbon for boosting selective $CO_2$ adsorption occurs when both in-plane sites and out-of-plane sites, each providing different nitrogen functionalities, are simultaneously activated in some embodiments. In embodiments, the in-plane sites serve as or provide nitrogen doping sites (i.e., graphitic, pyrrolic, pyridinic and/or pyridine groups) and the out-of-plane sites are targeted to be or provide one or more azo groups. Two sorbents in this modified carbon sorbent class may include, in some embodiments: (i) CS-AZO; and (ii) N-doped-carbon sorbent-azobenzene (hereinafter "N-CS-AZO"). Additionally, some embodiments of the enhanced surface chemistry may benefit from an electron transfer scheme for synthesis of CS-AZO hybrids. The resulting surface chemistry engineering approach enables one or more molecular level adjustments of electron distributions and surface polarities, thereby optimizing one or more noncovalent interactions of one or more modified carbon sorbent surfaces with gases, such as, for example, $CO_2$, $N_2$, $H_2$, or a combination thereof.

In one or more embodiments, one or more diazonium chemistries may produce, provide, and/or manufacture one or more nitrogen rich porous carbon adsorbents. The enhanced surface chemistry of the porous carbon and/or the mesoporous carbon for boosting and/or improving the selective $CO_2$ adsorption may be selected and/or achieved when the one or more diazonium chemistries are utilized and/or reacted. With simultaneous activation of both the in-plane sites and the out-of-plane sites, each of the sites may provide the one or more different nitrogen functionalities. For example, the in-plane sites may produce, provide, or serving as the nitrogen doping sites (i.e., graphitic, pyrrolic, pyridinic and pyridine) and the out-of-plane sites may produce, provide, or are targeted to be the azo groups. In some embodiments, two sorbents in this modified carbon sorbent class are: (i) CS-AZO; and (ii) N-CS-AZO as shown in FIG. 1. The one or more diazonium chemistries disclosed herein may enable at least one molecular level adjustment of electron distribution and surface polarity, thereby tailoring selectivity of $CO_2$ absorption, tailoring one or more noncovalent interactions of one or more modified carbon sorbent surfaces with, for example, $CO_2$, $N_2$, and $H_2$. For example, CS-AZO and N-CS-AZO hybrids are examples of the class of the modified carbon sorbents disclosed herein as shown in FIG. 1.

In some embodiments, at least one carbon matrix of adsorbents disclosed herein have enhanced and/or improved $CO_2$ selectivity. Two strategies disclosed herein improve the selectivity for $CO_2$ in carbon sorbents, wherein the first strategy comprises dispersing one or more aqueous amines in the carbon matrix and the second strategy comprises doping or incorporating of nitrogen into the carbon lattice/carbon surface/graphene lattice. For example, one or more nitrogen doping schemes may be based on nitrogen functionalities (i.e., pyridinic, pyrrolic, and graphitic groups) and are classified as N-containing heterocycles. One or more synthesis routes are used to incorporate the nitrogen into the carbon matrix, wherein the one or more synthesis routes may comprise treating pristine carbon sorbent with ammonia at temperatures ranging from 200 to 800° C. or deliberate selecting nitrogen containing carbon precursors, such a melamine. However, some carbon sorbents may suffer from weak in-plane physisorption of $CO_2$ with the nitrogen donor which may limit their selectivity. Thus, tailoring the carbon surface chemistry to maximize the synergistic effect of local dipole-$\pi$ and dipole-quadrupole interactions on carbon and different nitrogen functionalities is required. The limitation of nitrogen doping schemes may be address by incorporating different $CO_2$-philic groups into the sorbent frameworks, wherein carbon sorbents may be based on (i) at least one pristine carbon surface and (ii) one or more N-containing carbon heterocycles.

Figure 2:
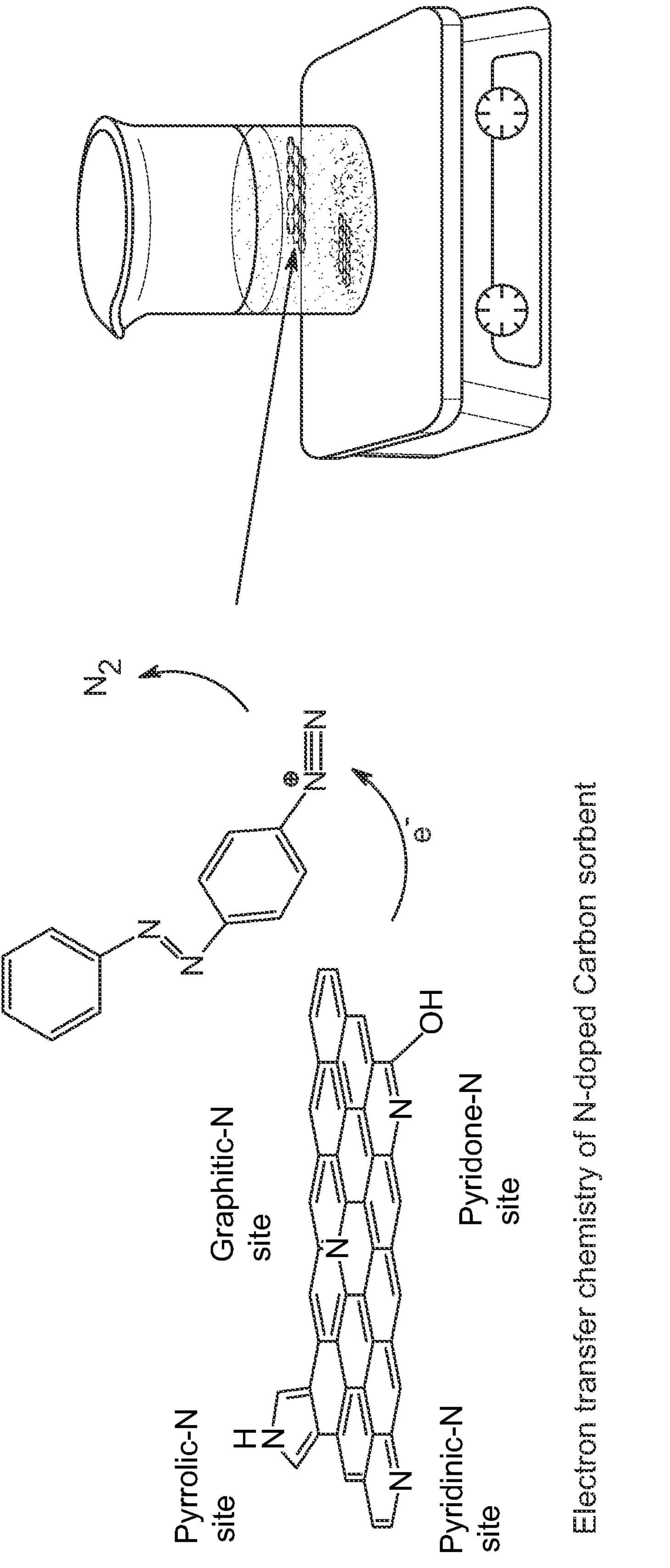
FIG. 2 illustrates synthesis of carbon sorbent-azobenzene hybrids, according to one or more embodiments of the present disclosure.
Figure 3:
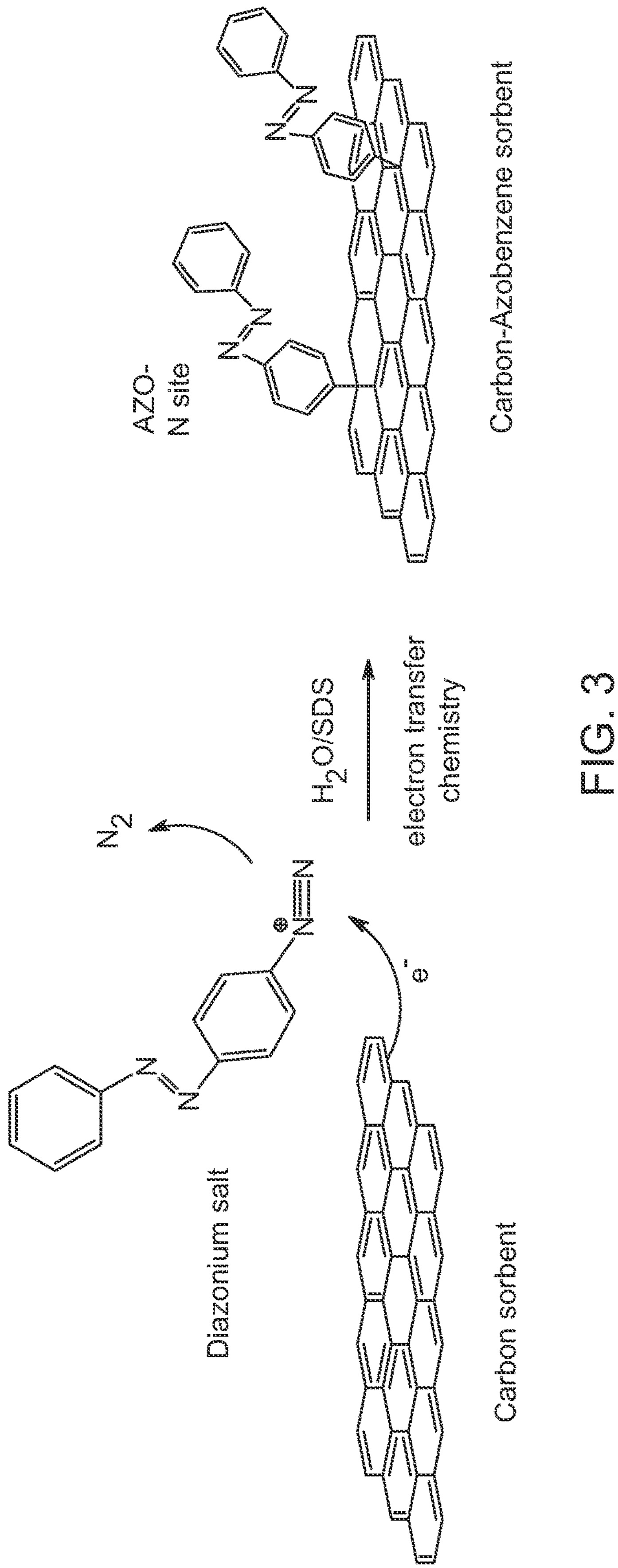
FIG. 3 illustrates synthesis of carbon sorbent-azobenzene hybrids, according to one or more embodiments of the present disclosure.
Figure 4:
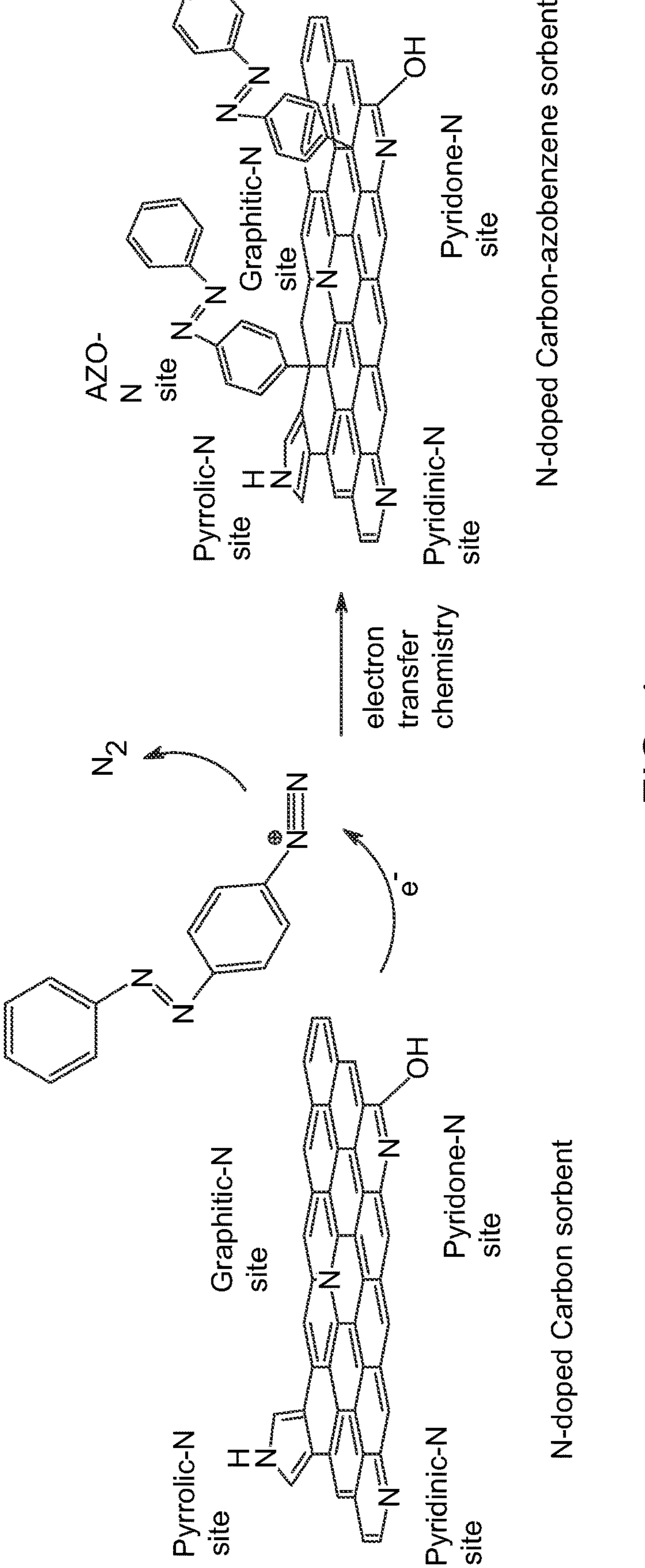
FIG. 4 illustrates synthesis of N-doped-carbon sorbent-azobenzene hybrids, according to one or more embodiments of the present disclosure.

FIG. 2 illustrates chemical synthesis of CS-AZO hybrids. The chemical synthesis disclosed herein introduces one or more nitrogen functionalities onto a separate plane from the nitrogen-containing carbon surface plane. Then, nitrogen in both planes can effectively engage and adsorb one or more $CO_2$ molecules. One or more synthesis methods incorporate nitrogen into the carbon lattice of the sorbent by deliberately selecting one or more nitrogen-containing carbon precursors alongside the primary carbon material. However, these synthesis approaches do not apply for incorporating one or more nitrogen functionalities in an out-of-plane configuration. The chemical synthesis disclosed herein utilize solvent-based in situ chemistry to attach the out-of-plane groups to the carbon surface. The reaction scheme is water-based as shown in FIG. 2, and thus may be scaled-up. The concerted reaction involves a covalent functionalization between $sp^2$ carbon in the carbon lattice and one or more N-containing diazonium salts. That is, modified carbon sorbent may be used as shown by highlighting CS-AZO hybrids as one example. The initial carbon sorbent may be pristine as shown in FIG. 3 or N-doped or N-incorporated as shown in FIG. 4. In either case, the azobenzene group is attachable to a $sp^2$ carbon for creating an accessible out-of-plane nitrogen functionality of an azo group. An electron transfer diazonium chemistry to synthesize the CS-AZO hybrids is shown in FIG. 2, wherein one or more initial nitrogen sites are confined in-plane of carbon matrix whereas the azo group are out-of-plane sites for $CO_2$ adsorption. The CS-AZO hybrids provide a plurality of interactions of dipole-IT and dipole-quadrupole between the $CO_2$ molecule as well as the one or more nitrogen functionalities at N doping sites (i.e., graphitic, pyrrolic, pyridinic, and pyridine groups) and the azo groups.

FIG. 3 also illustrates chemical synthesis of one or more CS-AZO hybrids, wherein carbon sorbent (left-side of FIG. 3) with no nitrogen doping sites is covalently functionalized with at least one electron transfer mechanism of the one or more diazonium salts for grafting and/or forming at least one CS-AZO hybrid (see right-side of FIG. 3).

FIG. 4 illustrates chemical synthesis of one or more N-CS-AZO hybrids, wherein carbon sorbent with one or more nitrogen doping sites, such as, for example, graphitic, pyrrolic, pyridinic, and/or pyridine groups, (see left-side of FIG. 4) is covalently functionalized with at least one electron transfer mechanism of the one or more diazonium salts grafting and/or forming at least one N-CS-AZO hybrid (see right-side of FIG. 4).

In one or more embodiments, at least one electron transfer diazonium chemistry may be utilized and/or reacted for synthesis of one or more CS-AZO hybrids. The at least one electron transfer diazonium chemistry may be initiated by placing at least one carbon sorbent in a reactor with an aqueous solution of 0.5 to 2 weight percent anionic surfactant. Diazonium salt is injected in a reactor vessel which is heated (~45 to 50° C.) and stirred. The reaction involves electron-transfer from the carbon lattice to the diazo moiety, which leads to cleavage of dinitrogen and generation of one or more aryl radicals. The one or more aryl radicals bind to the surface of carbon sorbent via one or more covalent bonds. Anionic surfactant, such as, for example, a diazonium ion is cationic, and hence the anionic surfactant may significantly increase the ability of the surfactant layer to stabilize the diazonium ion near the carbon sorbent surface.

Figure 5:
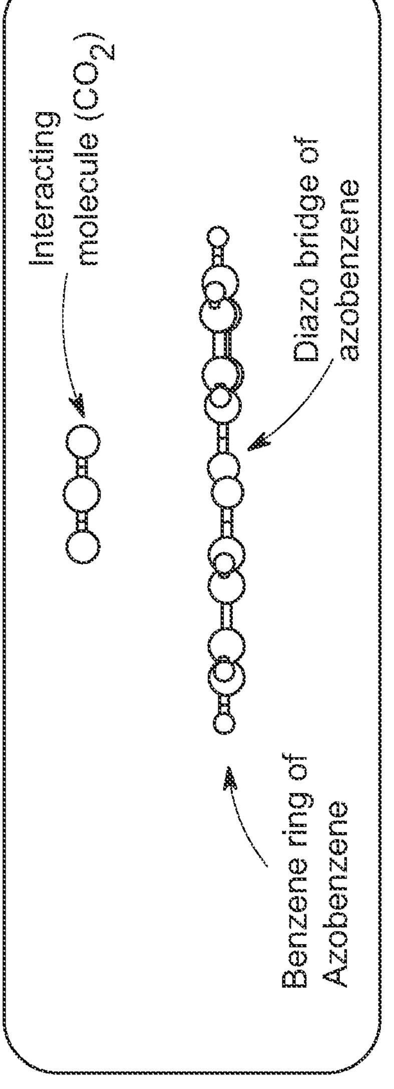
FIGS. 5 and 6 illustrate interaction energies between gas molecules and azo bridges in azobenzenes, according to one or more embodiments of the present disclosure.
Figure 5:
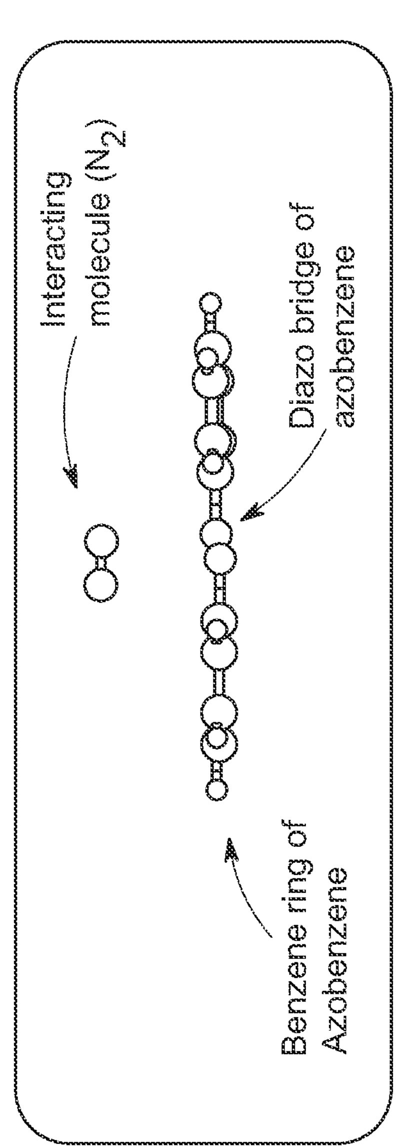
Figure 6:
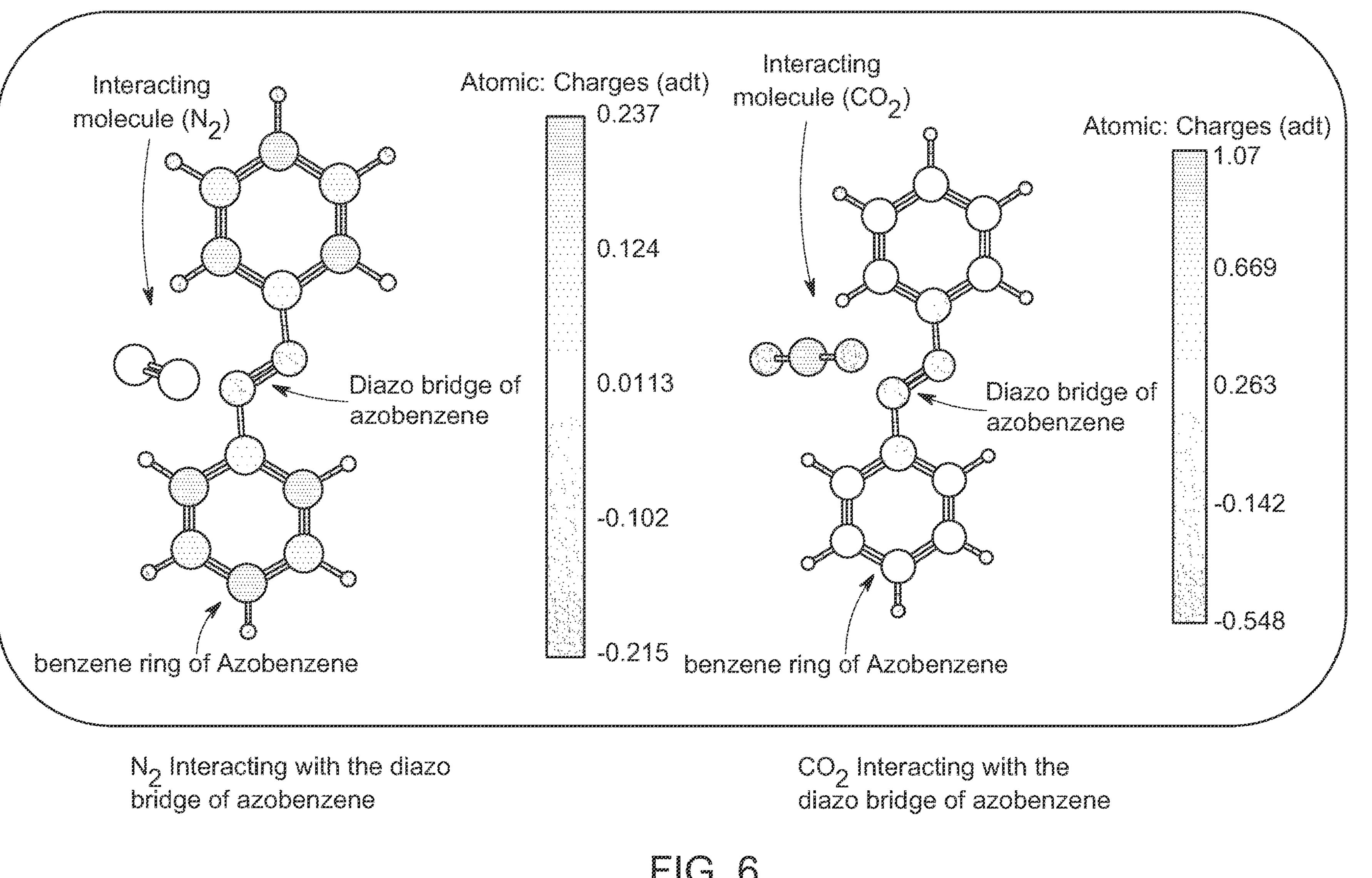

In some embodiments, $N_2$ and $CO_2$ molecularly binds with the diazo bridge in post-combustion mixtures as shown in FIGS. 5 and 6 and binding energy calculations may be provided or performed for relative gas affinities. To further illustrate the effectiveness of CS-AZO hybrids for $CO_2$ modified sorbents, calculations were performed for the interaction energy between the gas molecules of interest, such as, for example, $N_2$, $H_2$, and/or $CO_2$ and the azo-group based on B3LYP functional with Grimme's D3 dispersion correction along with Becke-Johnson damping at TZ2P basis set, noted as B3LYP-D3 (BJ)/TZ2P level. The calculated binding energy for $N_2$ interacting with azo bridge is 7.00 kJ/mol, and that of $CO_2$ interacting with one or more azo bridges is 13.68 kJ/mol. Thus, it may be concluded that the binding energy shows a higher selectivity for $CO_2$ than $N_2$ for these azo bridges. Similarly, for pre-combustion mixture, the $N_2$ and $H_2$ molecule binding energies with the one or more diazo bridges were calculated. The binding energy for $H_2$ interacting with azo bridge is 2.93 kJ/mol and for $CO_2$ interacting with azo bridge is 13.68 kJ/mol. Again, the binding energy calculation suggests a higher selectivity for $CO_2$ in comparison to $H_2$ for these azo bridges.

FIGS. 5 and 6 illustrate interaction energies between the gas molecules of interest, such as, for example, $CO_2$ and/or $N_2$ and the azo bridges in azobenzenes. The distribution of interaction energy between the gas molecules and the added nitrogen functionalities of azo bridge provides supporting evidence that selective $CO_2$ adsorption is boosted and/or improved on adding these functionalities to the pristine carbon sorbents and/or N-doped carbon sorbents. Thus, modified carbon sorbents have increased and/or improved $CO_2$ capture potential when directly compared to unmodified sorbents. In some embodiments, the modified carbon sorbents disclosed herein may be provided and/or produced by (i) covalent functionalization of the carbon lattice with $CO_2$ selective azobenzene, (ii) incorporating both in-plane and out-of-plane $CO_2$ philic groups, and/or (iii) utilization of a solution-based synthesis to incorporate out-of-carbon lattice plane nitrogen functionalities.

In one or more embodiments, one or more CCUS technologies may include, incorporate, and/or utilize the CS-AZO hybrids disclosed herein for the $CO_2$ capture, $CO_2$ utilization, $CO_2$ storage, or a mixture thereof. The CS-AZO hybrids disclosed herein may be, have, achieve, exhibit, and/or provide improved higher $CO_2$ absorption efficiencies, improved higher loading capacities, or a combination thereof. As a result, the CS-AZO hybrids disclosed herein may be included, incorporated, and/or utilized in one or more industrial scale applications to capture $CO_2$ from, for example, one or more natural gas extractions, one or more gas refineries, and/or one or more exhaust gases produced by one or more fossil fuel-fired power generations. In some embodiments, methods disclosed herein may utilize the CS-AZO hybrids to remove $CO_2$ from one or more gaseous streams, such as, for example, a flue gas, a natural gas, a hydrogen gas, a synthesis gas, one or more waste gas streams, or a combination thereof. In an embodiment, these methods may utilize the CS-AZO hybrids disclosed herein to contact at least one gaseous stream and/or capture $CO_2$ of the at least one gaseous stream.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A carbon-based sorbent configured for improved carbon capture, the carbon-based sorbent comprising:

at least one modified carbon-based sorbent comprising:

mesoporous carbon surfaces configured to improve selective $CO_2$ adsorption; and at least one carbonaceous material selected from the group consisting of activated carbon, biomass-derived materials, polymer-based synthetic porous or mesoporous carbon, carbonized carbohydrates, and combinations thereof, wherein the mesoporous carbon surfaces comprise one or more in-plane sites having at least one first nitrogen functionality and one or more out-of-plane sites having at least one second nitrogen functionality, wherein the at least one first nitrogen functionality is a different nitrogen functionality than the at least one second nitrogen functionality, wherein the one or more in-plane sites are one or more graphitic-N sites, one or more pyrrolic-N sites, one or more pyridinic-N sites, one or more pyridine-N sites, or a combination thereof, and wherein the one or more out-of-plane sites are one or more azobenzene-N sites.

2. The carbon-based sorbent of claim 1, wherein the one or more in-plane sites are at least one graphitic-N site, at least one pyrrolic-N site, at least one pyridinic-N site, and at least one pyridine-N site.

3. The carbon-based sorbent of claim 1, wherein the at least one modified carbon-based sorbent is a carbon sorbent-azobenzene hybrid formed by covalent functionalization of the mesoporous carbon surfaces with an azobenzene-containing diazonium salt via electron transfer diazonium chemistry.

4. The carbon-based sorbent of claim 3, wherein the carbon sorbent-azobenzene hybrid is a N-doped-carbon sorbent-azobenzene hybrid.

5. A method for increasing $CO_2$ capture potential of the carbon-based sorbent of claim 1, the method comprising:

covalently functionalizing at least one carbon lattice of the carbon-based sorbent comprising mesoporous carbon surfaces;

incorporating one or more in-plane $CO_2$ philic groups and one or more out-of-plane $CO_2$ philic groups into the carbon-based sorbent; and incorporating one or more out-of-carbon lattice plane nitrogen functionalities into the carbon-based sorbent to produce the at least one modified carbon-based sorbent.

6. The method of claim 5, wherein the at least one modified carbon-based sorbent is a carbon sorbent-azobenzene hybrid.

7. The method of claim 6, wherein the carbon sorbent-azobenzene hybrid is a N-doped-carbon sorbent-azobenzene hybrid.

8. The method of claim 5, wherein the one or more in-plane $CO_2$ philic groups comprise nitrogen doping groups.

9. The method of claim 8, wherein the nitrogen doping groups are one or more graphitic-based groups, one or more pyrrolic-based groups, one or more pyridinic-based groups, one or more pyridine-based sites, or a combination thereof.

10. The method of claim 8, wherein the one or more out-of-plane $CO_2$ philic groups is/are one or more azobenzene-based groups.

11. The method of claim 5, wherein the one or more in-plane $CO_2$ philic groups are at least one graphitic-N group, at least one pyrrolic-N group, at least one pyridinic-N group, and at least one pyridine-N group, and the one or more out-of-plane $CO_2$ philic groups are one or more azobenzene-N groups.

12. The method of claim 5, further comprising:

improving selective $CO_2$ adsorption by simultaneously activating the one or more in-plane $CO_2$ philic groups and the one or more out-of-plane $CO_2$ philic groups.

13. A method for improving noncovalent interactions of the carbon-based sorbent of claim 1 with $CO_2$, $N_2$, and $H_2$, the method comprising:

providing the modified carbon-based sorbent comprising mesoporous carbon surfaces; and simultaneously activating one or more in-plane sites and one or more out-of-plane sites of the mesoporous carbon surfaces.

14. The method of claim 13, further comprising:

selectively capturing $CO_2$ with the modified carbon-based sorbent during syngas processing, post-combustion processing, or pre-combustion processing.

15. The method of claim 13, wherein the modified carbon-based sorbent is a carbon sorbent-azobenzene hybrid or a N-doped-carbon sorbent-azobenzene hybrid.

16. The method of claim 13, wherein the one or more in-plane sites is/are nitrogen doping sites and the one or more out-of-plane sites is/are azobenzene-N sites.

17. The method of claim 13, further comprising:

contacting the modified carbon-based sorbent to at least one gaseous stream comprising $CO_2$ therein.

18. The carbon-based sorbent of claim 1, wherein:

the at least one modified carbon-based sorbent is a N-doped-carbon sorbent-azobenzene hybrid formed by covalent functionalization of the mesoporous carbon surfaces with an azobenzene-containing diazonium salt via electron transfer diazonium chemistry;

the one or more in-plane sites are at least one graphitic-N site, at least one pyrrolic-N site, at least one pyridinic-N site, and at least one pyridine-N site;

the carbon-based sorbent exhibits a calculated binding energy for $CO_2$ interacting with one or more azo bridges of about 13.68 kJ/mol, a calculated binding energy for $N_2$ interacting with one or more azo bridges of about 7.00 kJ/mol, and a calculated binding energy for $H_2$ interacting with one or more azo bridges of about 2.93 kJ/mol; and the carbon-based sorbent is configured for use in a carbon capture, utilization, and storage (CCUS) application selected from the group consisting of post-combustion $CO_2$ capture from flue gas, pre-combustion $CO_2$ capture from synthesis gas, $CO_2$ capture from natural gas extraction, $CO_2$ capture from gas refineries, $CO_2$ capture from exhaust gases produced by fossil fuel-fired power generation, and combinations thereof.

* * * * *